United States Patent
Imoto et al.

(10) Patent No.: US 12,548,759 B2
(45) Date of Patent: Feb. 10, 2026

(54) BATTERY AND METHOD FOR PRODUCING SAME

(71) Applicant: TeraWatt Technology K.K., Yokohama (JP)

(72) Inventors: Hiroshi Imoto, Yokohama (JP); Ken Ogata, Yokohama (JP)

(73) Assignee: TeraWatt Technology K.K., Tokyo (JP)

( * ) Notice: Subject to any disclaimer, the term of this patent is extended or adjusted under 35 U.S.C. 154(b) by 558 days.

(21) Appl. No.: 17/982,072

(22) Filed: Nov. 7, 2022

(65) Prior Publication Data

US 2023/0065750 A1   Mar. 2, 2023

Related U.S. Application Data

(63) Continuation of application No. PCT/JP2020/018957, filed on May 12, 2020.

(51) Int. Cl.
*H01M 4/134* (2010.01)
*H01M 4/38* (2006.01)
*H01M 4/587* (2010.01)
*H01M 10/0525* (2010.01)
*H01M 10/0585* (2010.01)
*H01M 50/449* (2021.01)

(52) U.S. Cl.
CPC ........... *H01M 4/134* (2013.01); *H01M 4/38* (2013.01); *H01M 4/587* (2013.01); *H01M 10/0525* (2013.01); *H01M 10/0585* (2013.01); *H01M 50/449* (2021.01)

(58) Field of Classification Search
CPC .................................................. H01M 4/134
See application file for complete search history.

(56) References Cited

U.S. PATENT DOCUMENTS

| | | | |
|---|---|---|---|
| 2009/0253033 A1* | 10/2009 | Hirose | H01M 4/364 429/176 |
| 2019/0260066 A1 | 8/2019 | Hu et al. | |
| 2020/0067075 A1* | 2/2020 | Choi | H01M 4/624 |
| 2020/0075990 A1 | 3/2020 | Park et al. | |

(Continued)

FOREIGN PATENT DOCUMENTS

| EP | 3537516 A1 | 9/2019 |
|---|---|---|
| JP | 2019-517722 A | 6/2019 |

(Continued)

OTHER PUBLICATIONS

WO9926306andTransaltion (Year: 1999).*
International Search Report for PCT/JP2020/018957 dated Aug. 4, 2020, 2 pages.

*Primary Examiner* — Brian R Ohara
(74) *Attorney, Agent, or Firm* — Kilpatrick Townsend & Stockton LLP

(57) ABSTRACT

A battery is provided that has excellent energy density and excellent cycle characteristics early in the cycle. The battery in one aspect of the present invention comprises: a positive electrode; a negative electrode free of a negative electrode active material; a separator that is disposed between the positive electrode and the negative electrode; and a carbon layer that is disposed between the separator and the negative electrode, wherein the capacity of the carbon layer is 22% or less of the capacity of the positive electrode.

15 Claims, 13 Drawing Sheets

(56) References Cited

U.S. PATENT DOCUMENTS

2020/0152986 A1* 5/2020 Lee ..................... H01M 4/0447
2022/0320497 A1* 10/2022 Konishi ................ H01M 4/382

FOREIGN PATENT DOCUMENTS

| JP | 2019102400 A | 6/2019 |
| JP | 2019-537226 A | 12/2019 |
| JP | 2019-537231 A | 12/2019 |
| KR | 20180121391 A | 11/2018 |
| WO | 2019/087709 A1 | 5/2019 |

* cited by examiner

BATTERY AND METHOD FOR PRODUCING SAME

CROSS-REFERENCE TO RELATED APPLICATIONS

This application is a continuation of International Application No. PCT/JP2020/018957, filed May 12, 2020, the entire contents of which are incorporated by reference.

TECHNICAL FIELD

The present invention relates to a battery and to a method for producing such a battery.

BACKGROUND ART

In recent years, techniques for converting natural energy such as solar power or wind power into electric energy have attracted more attention. Accordingly, various batteries have been developed as storage devices that are safe and that can store a large amount of electric energy.

Among these, secondary batteries that charge and discharge by transferring metal ions between a positive electrode and a negative electrode are known to have a high voltage and high energy density, and are usually lithium ion secondary batteries. In a typical lithium ion secondary battery, an active material capable of retaining lithium is introduced into the positive electrode and the negative electrode, and charging and discharging are performed by exchanging lithium ions between the positive electrode active material and the negative electrode active material. A battery has also been developed that does not use an active material in the negative electrode, but the secondary battery retains lithium by depositing lithium metal on the surface of the negative electrode.

For example, Patent Document 1 discloses a high energy density, high power lithium metal anode secondary battery with a volumetric energy density greater than 1000 Wh/L and/or a mass energy density greater than 350 Wh/kg when discharged at room temperature at a rate of at least 1 C. Patent Document 1 discloses that an ultrathin lithium metal anode is used to realize this lithium metal anode secondary battery.

Patent Document 2 discloses a lithium secondary battery containing a positive electrode, a negative electrode, a separation film interposed between the electrodes, and an electrolyte. In the negative electrode of this lithium secondary battery, metal particles are formed on the negative electrode current collector and move from the positive electrode during charging to form lithium metal on the negative electrode current collector in the negative electrode. Patent Document 2 discloses that this lithium secondary battery can solve problems caused by the reactivity of lithium metal and problems that occur during the assembly process, and has improved performance and a longer service life.

CITATION LIST

Patent Literature

Patent Document 1: JP 2019-517722 A
Patent Document 2: JP 2019-537226 A

SUMMARY OF INVENTION

Technical Problem

When the present inventors studied secondary batteries of the prior art including those described in the patent documents mentioned above, they found that all of them were insufficient in terms of energy density and cycle characteristics.

For example, a typical secondary battery that charges and discharges by transferring metal ions between a positive electrode active material and a negative electrode active material does not have sufficient energy density. Meanwhile, in lithium metal secondary batteries that retain lithium by depositing lithium metal on the surface of the negative electrode, such as those described in the patent documents listed above, dendrites tend to form on the surface of the negative electrode after repeated charging and discharging, which makes short-circuiting and capacity loss more likely to occur. As a result, the cycle characteristics are not sufficient.

A method has also been developed of applying a large amount of physical pressure to a lithium metal secondary battery to keep the interface between the negative electrode and the separator under high pressure and suppress discrete growth during lithium metal precipitation. However, because a large mechanical mechanism is required to apply such a high level of pressure, the weight and volume of the battery increase as a whole, and the energy density decreases.

In view of these problems, it is an object of the present invention to provide a battery having high energy density and excellent cycle characteristics early in the cycle.

Solution to Problem

One aspect of the present invention is a battery comprising: a positive electrode; a negative electrode that is free of a negative electrode active material; a separator that is disposed between the positive electrode and the negative electrode; and a carbon layer that is disposed between the separator and the negative electrode, wherein the capacity of the carbon layer is 22% or less of the capacity of the positive electrode.

Because the potential is applied to the metal layer deposited on the surface of the negative electrode via the negative electrode and carbon in the battery in this aspect of the present invention, the deposited metal layer can be formed and dissolved uniformly. As a result, the formation of dendrites on the surface of the negative electrode is suppressed, and this contributes to an improvement in cycle characteristics. When a so-called irreversible carrier metal is present that can be doped in the carbon layer but cannot be undoped, an excessive carbon layer causes a decrease in energy density. In the present invention, a drop in the initial energy density is suppressed by setting the capacity of the carbon layer to a level that is 22% or less of the capacity of the positive electrode.

Preferably, the battery also has an electrolytic solution in which the separator and the carbon layer are immersed. Because the electrolytic solution acts as a conductive path for the metal ions that serve as the charge carrier, the internal resistance of the battery is lowered and this contributes to improvements in the energy density and cycle characteristics.

The carbon layer may contain a metal that can form an alloy with lithium. This metal has the effect of assisting in the transfer of lithium during charging and discharging, and this contributes to improvements in energy density and cycle characteristics.

The capacity of the carbon layer is 5% or more of the capacity of the positive electrode. As a result, sufficient potential can be applied from the carbon layer side relative to the deposited metal layer formed on the surface of the negative electrode, and this contributes to suppression of dendrite formation.

The separator may include a separator base material and a separator coating layer coating one or both sides of the separator base material. By selecting the proper material for the separator coating layer, adhesion between the separator and the positive electrode or carbon layer can be improved while allowing for passage of the metal ions that serve as the charge carrier.

The battery is preferably a lithium secondary battery that performs charging and discharging by depositing lithium metal on the surface of the negative electrode and dissolving the deposited lithium. In the present invention, such a lithium secondary battery exhibits improved energy density and cycle characteristics early in the cycle.

Another aspect of the present invention is a method for producing a battery, the method comprising the steps of: forming a carbon layer on at least one surface of the separator and the negative electrode arranged so as to face each other; and forming a laminate by laminating the negative electrode, the separator, and the positive electrode, wherein a carbon layer having a capacity of 22% or less of the capacity of the positive electrode is formed in the step of forming the carbon layer. By using this configuration, a battery with excellent energy density and cycle characteristics early in the cycle can be produced.

The carbon layer may be formed on the separator in the step of forming the carbon layer. Preferably, the step of forming the carbon layer on the separator includes a step of forming the carbon layer on a base material, and a step of transferring the carbon layer on the base material to the separator. A carbon layer with a uniform thickness can be formed on the separator by transferring the carbon layer on the base material to the separator after forming the carbon layer on the base material. Preferably, the step of transferring the carbon layer on the base material to the separator includes a step of adhering the carbon layer on the base material and the separator via an adhesive layer and a step of peeling off the base material. This forms a carbon layer that adheres firmly to the separator.

The carbon layer may be formed on the negative electrode in the step of forming the carbon layer. Alternatively, the carbon layer may be formed on both surfaces of the separator and the negative electrode arranged so as to face each other in the step of forming the carbon layer.

A carbon layer containing a metal that is able to form an alloy with lithium may be formed in the step of forming the carbon layer. This metal has the effect of assisting in the transfer of lithium during charging and discharging, and a battery can be produced that has excellent energy density and cycle characteristics.

The method for producing a battery may further comprise a step of injecting an electrolytic solution into the laminate in the step of forming the laminate. Because the electrolytic solution acts as a conductive path for the metal ions that serve as the charge carrier, the internal resistance of the battery is lowered, and a battery can be produced that has excellent energy density and cycle characteristics.

A carbon layer having a capacity that is 5% or more of the capacity of the positive electrode is preferably formed in the step of forming the carbon layer. As a result, sufficient potential can be applied from the carbon layer side relative to the deposited metal layer formed on the surface of the negative electrode, and a carbon layer that contributes to dendrite suppression is formed.

Effect of Invention

The present invention is able to provide a battery having high energy density and excellent cycle characteristics early in the cycle.

DESCRIPTION OF EMBODIMENTS

Figure 1:
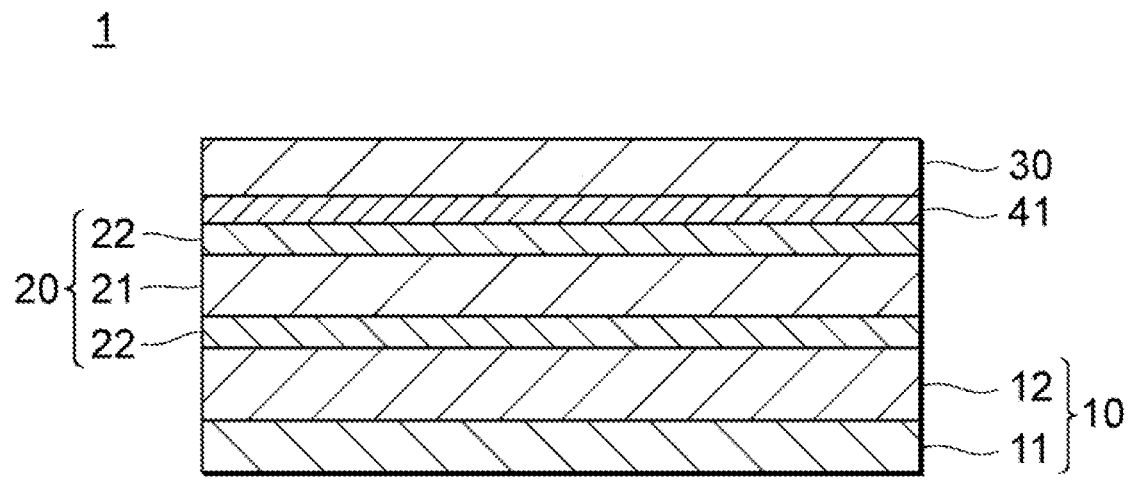
FIG. 1 is a schematic diagram of the battery in the first embodiment of the present invention.

Embodiments of the present invention ("embodiments" below) will now be described with reference to the drawings when necessary. In the drawings, identical elements are designated by the same reference numbers, and redundant descriptions of these elements has been omitted. Positional relationships such as up, down, left, and right are based on the positional relationship shown in the drawings unless otherwise specified. The dimensional ratios shown in the drawings are not limited to the depicted ratios.

1st Embodiment

FIG. 1 is a schematic diagram of the battery in the first embodiment. As shown in FIG. 1, the battery 1 in the first embodiment has a positive electrode 10, a negative electrode 30 that is free of a negative electrode active material, a separator 20 that is disposed between the positive electrode 10 and the negative electrode 30, and a carbon layer 41 that is disposed between the separator 20 and the negative electrode 30.

Positive Electrode

The positive electrode 10 has a positive electrode current collector 11 and a positive electrode active material layer 12 formed on the positive electrode current collector 11.

There are no particular restrictions on the positive electrode current collector 11 as long as it is a conductor that does not react with the metal ions serving as charge carriers in the battery. When the charge carrier metal is lithium, aluminum can be used as the positive electrode current collector.

The positive electrode active material layer 12 is a material used to hold metal ions in the positive electrode, and this serves as a host material for the metal ions. The positive electrode active material layer 12 is provided to improve the stability and output voltage of the battery 1.

The positive electrode active material layer 12 contains a positive electrode active material. Examples of positive electrode active materials include, but are not limited to, metal oxides and metal phosphates. Examples of metal oxides include, but are not limited to, cobalt oxide-based compounds, manganese oxide-based compounds, and nickel oxide-based compounds. Examples of metal phosphates include, but are not limited to, iron phosphate-based compounds and cobalt phosphate-based compounds. When the carrier metal is lithium ions, typical examples of positive electrode active materials include lithium nickel cobalt aluminum oxide (NCA, $LiNiCoAlO_2$), lithium nickel cobalt magnesium oxide ($LiNiCoMnO_2$, referred to as NCM and depending on the difference in element ratio sometimes as NCM622, NCM523, NCM811, etc.), lithium cobaltate (LCO, $LiCoO_2$) and lithium iron phosphate (LFP, $LiFePO_4$) can be mentioned. These positive electrode active materials can be used alone or in combinations of two or more.

The positive electrode active material layer 12 may contain a binder. Examples of binders include fluorine-based binders, water-based binders, and imide-based binders. Specific examples of binders include polyvinylidene fluoride (PvDF), styrene-butadiene rubber and carboxymethyl cellulose (SBR-CMC) mixtures, polyacrylic acid (PAA), lithium polyacrylate (Li-PAA), polyimide (PI), polyamideimide (PAI), and aramids.

The positive electrode active material layer 12 may contain a conductive aid. Examples of conductive aids that can be used include carbon black, carbon nanofibers (VGCF), single-walled carbon nanotubes (SWCNT), and multi-walled carbon nanotubes (MWCNT).

The weight per unit area of the positive electrode active material layer 12 can be, for example, from 10 to 40 $mg/cm^2$. The thickness of the positive electrode active material layer 12 can be, for example, from 30 to 150 µm. The density of the positive electrode active material layer 12 can be, for example, from 2.5 to 4.5 g/ml. The areal capacity of the positive electrode active material layer 12 can be, for example, from 1.0 to 10.0 $mAh/cm^2$.

Negative Electrode

The negative electrode 30 is free of a negative electrode active material and consists of a negative electrode current collector. It can be difficult to increase the energy density of a battery that has a negative electrode including a negative electrode active material because of the presence of the negative electrode active material. However, because the battery 1 in the present embodiment has a negative electrode 30 that is free of a negative electrode active material, this problem does not arise. In other words, the battery 1 in the present embodiment has a high energy density because charging and discharging are performed by depositing metal on the surface of the negative electrode 30 and dissolving the deposited metal.

Here, "negative electrode active material" refers to the material holding the metal ("carrier metal") corresponding to the metal ions serving as the charge carrier in the battery on the negative electrode, and may also be referred to as the carrier metal host material. Examples of holding mechanisms include, but are not limited to, intercalation, alloying, and occlusion of metallic clusters. The capacity of the "negative electrode active material" layer is usually set to the same capacity as that of the positive electrode. A carbon layer may also be used as a conventional negative electrode active material layer. However, in the present embodiment, the capacity of the carbon layer is 22% or less of the capacity of the positive electrode, so the effect is completely different from carbon in a conventional negative electrode active material.

There are no particular restrictions on the negative electrode active material as long as it has the retention mechanism mentioned above. Examples of negative electrode active materials include, but are not limited to, carbon-based substances, metal oxides, metals, and alloys. Carbon-based substances include, but are not limited to, graphene, graphite, hard carbon, mesoporous carbon, carbon nanotubes, and carbon nanohorns. Examples of metal oxides include, but are not limited to, titanium oxide-based compounds, tin oxide-based compounds, and cobalt oxide-based compounds. There are no particular restrictions on the metal or alloy as long as it can be alloyed with the carrier metal. Examples include silicon, germanium, tin, lead, aluminum, gallium, and alloys containing these.

There are no particular restrictions on the negative electrode 30 as long as it does not contain a negative electrode active material and can be used as a current collector. Examples include at least one type selected from the group consisting of metals such as Cu, Ni, Ti, Fe and other metals that do not react with Li, alloys of these metals, and stainless steel (SUS). When SUS is used as the negative electrode 12, any well-known type of SUS can be used. The negative electrode materials mentioned above may be used alone or in combinations of two or more. A "metal that does not react with Li" refers to a metal that does not react with lithium ions or lithium metal to form an alloy under the operating conditions of the battery 1.

The negative electrode 30 is preferably a lithium-free electrode. Because highly flammable lithium metal does not have to be used in the production process, a battery 1 with even better safety and productivity can be realized. From this standpoint and from the standpoint of improving the stability of the negative electrode 30, the negative electrode 30 is preferably at least one type selected from the group consisting of Cu, Ni, alloys of these metals, and stainless steel (SUS). From the same standpoints, the negative electrode 30 is more preferably made of Cu, Ni, or alloys of these metals, and even more preferably of Cu or Ni.

Separator

The separator 20 is the component that separates the positive electrode 10 and the negative electrode 30 to prevent short circuiting, while maintaining conductivity of the metal ions serving as the charge carrier between the positive electrode 10 and the negative electrode 30. It is also a component that does not react with the metal ions.

When an electrolytic solution is used, the separator 20 also plays a role in retaining the electrolytic solution. There are no particular restrictions on the separator base material 21 constituting the separator 20 as long as it can play this role, and can be, for example, a porous material such as porous polyethylene (PE), polypropylene (PP), or a laminated structure thereof.

The separator 20 preferably has a separator base material 21 and a separator coating layer 22 coating the surface of the separator base material 21. In the present embodiment, the separator coating layer 22 can be applied to one or both sides of the separator base material 21. The separator coating layer 22 firmly adheres the separator base material 21 to the adjacent layers above and below the base material (the carbon layer 41 and the positive electrode active material layer 12 in FIG. 1), while maintaining ionic conductivity and without reacting with the metal ions serving as the charge carriers. The separator coating layer 22 may include a binder containing inorganic particles such as silica, alumina, titania, zirconia, magnesium oxide, or magnesium hydroxide.

Carbon Layer

The carbon layer 41 is provided to suppress the formation of dendrites by applying potential to the metal layer deposited on the surface of the negative electrode. Because the carbon layer 41 is conductive and does not react with the surrounding components such as the electrolytic solution, it is suitable as a material for applying an electric potential to the deposited metal layer formed on the surface of the negative electrode. This contributes to an improvement in cycle characteristics. The carbon layer 41 is interposed between the negative electrode 30 and the separator 20. In the first embodiment, the carbon layer 41 adheres more strongly to the separator 20 than to the negative electrode 30.

The capacity of the carbon layer 41 is set to 22% or less of the capacity of the positive electrode. The carbon layer itself can also contribute to the capacity by doping and dedoping lithium. When so-called irreversible lithium is present that can be doped in the carbon layer but cannot be undoped, an excessive carbon layer causes a decrease in energy density. In the present invention, a drop in the initial energy density is suppressed by setting the capacity of the carbon layer to a level that is 22% or less of the capacity of the positive electrode. Here, capacity refers to the discharge capacity. The capacity of the positive electrode is determined primarily by the capacity of the positive electrode active material layer 12. The carbon layer 41 contains a carbon material such as hard carbon or graphite.

The carbon layer 41 may contain a binder to disperse the carbon material. Specific examples of binders include polyvinylidene fluoride (PvDF), styrene-butadiene rubber and carboxymethyl cellulose (SBR-CMC) mixtures, polyacrylic acid (PAA), lithium polyacrylate (Li-PAA), polyimide (PI), polyamideimide (PAI), and aramids.

The carbon layer 41 may contain a conductive aid. Examples of conductive aids that can be used include carbon black, carbon nanofibers (VGCF), single-walled carbon nanotubes (SWCNT), and multi-walled carbon nanotubes (MWCNT).

The weight per unit area of the carbon layer 41 can be, for example, from 0.01 to 15 mg/cm$^2$. The thickness of the carbon layer 41 can be, for example, from 0.1 to 50 μm. The density of the carbon layer 41 can be, for example, from 0.1 to 2.0 g/ml. The areal capacity of the carbon layer 41 can be, for example, from 0.01 to 3.0 mAh/cm$^2$.

Electrolytic Solution

The battery 1 may contain an electrolytic solution. The separator 20 and the carbon layer 41 are immersed in the electrolytic solution. The electrolytic solution is an ionically conductive solution prepared by dissolving an electrolyte in a solvent that acts as a conductive path for lithium ions. When an electrolytic solution is used, the internal resistance of the battery 1 can be lowered and the energy density and cycle characteristics improved.

A lithium salt is preferably used as the electrolyte. Examples of lithium salts include, but are not limited to, LiPF$_6$, LiBF$_4$, lithium bis(trifluoromethanesulfonyl)imide (LiTFSI), lithium bis(fluorosulfonyl)imide (LiFSI), LiClO$_4$, lithium bisoxalate borate (LiBOB), and lithium bis(pentafluoroethanesulfonyl)imide (LiBETI). The lithium salt is preferably LiFSI from the standpoint of improving the cycle characteristics of the battery 1 even more. These lithium salts may be used alone or in combinations of two or more.

Examples of solvents include, but are not limited to, ethylene carbonate (EC), propylene carbonate (PC), dimethyl carbonate (DMC), 1,2-dimethoxyethane (DME), diethyl carbonate (DEC), γ-butyrolactone (GBL), 1,3-dioxolane (DOL), and fluoroethylene carbonate (FEC).

In the present specification, "suppressing the formation of dendrites on the surface of the negative electrode" means keeping the carrier metal precipitates formed on the surface of the negative electrode from becoming dendrite-like due to repeated charging and discharging of the solid-state battery. In other words, it means inducing carrier metal precipitates formed on the surface of the negative electrode to grow in a non-dendritic form during charging and discharging or repeated charging and discharging of the solid-state battery. Here, the "non-dendrite form" typically means a plate-like form or peak and valley-like form.

Use of Battery

Figure 2:
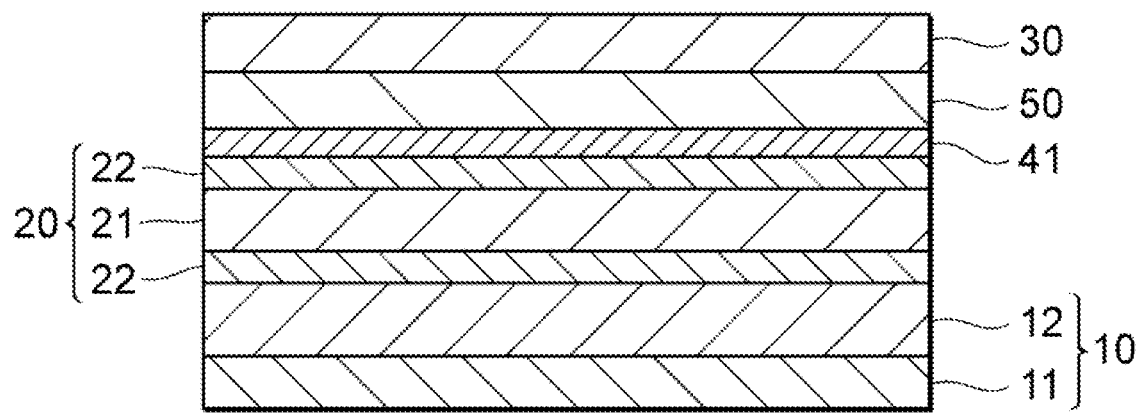
FIG. 2 is a schematic diagram of the battery in the first embodiment of the present invention at one point in the charging and discharging cycle.

FIG. 2 is a schematic diagram of the battery in the first embodiment at one point in the charging and discharging cycle. In the battery in the present embodiment, lithium metal is deposited on the negative electrode 30 during charging to form a deposited metal layer 50, and the deposited metal layer 50 on the negative electrode 30 dissolves during discharging. In the battery of the present embodiment, because the carbon layer 41 is securely adhered to the separator 20, the deposited metal layer 50 forms between the negative electrode 30 and the separator 41.

In the present embodiment, because uniform potential can be applied from both sides of the deposited metal layer 50 on the surface of the negative electrode 30 via the negative electrode 30 and the carbon layer 41, the deposited metal film 50 can be deposited uniformly and efficiently dissolved. Therefore, the present embodiment can suppress growth of the deposited metal layer 50 in dendrite form and keep an undissolved inactive deposited metal layer 50 from remaining behind, thus improving the cycle characteristics. Meanwhile, the carbon layer 41 itself is able to contribute to the capacity by doping and dedoping lithium. When so-called irreversible lithium is present that can be doped in the carbon layer 41 but cannot be undoped, an excessive carbon layer 41 causes a decrease in energy density. In the present invention, a drop in the initial energy density can be suppressed by setting the capacity of the carbon layer 41 to a level that is 22% or less of the capacity of the positive electrode.

Battery Production Method

Figure 3:
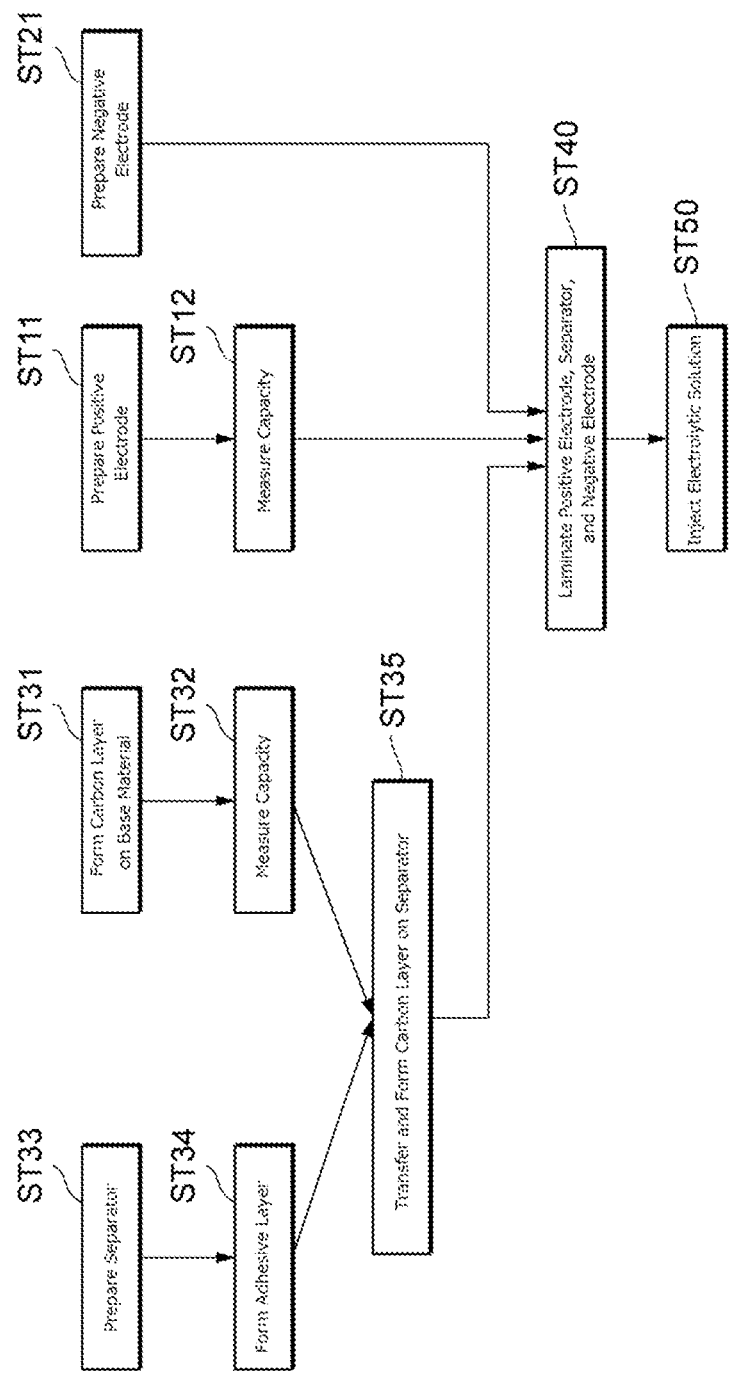
FIG. 3 is a flow chart showing the production steps of the battery in the first embodiment of the present invention.

The method used to produce the battery in the present embodiment will now be explained with reference to the flowchart in FIG. 3 and the cross-sectional views in FIG. 4 to FIG. 12.

Figure 4:
FIG. 4 is a cross-sectional view of a step in the production process for the battery in the first embodiment of the present invention.

First, the positive electrode 10 is prepared (step ST11). The positive electrode 10 can be prepared, for example, in the following manner. The positive electrode active material, binder, and, if necessary, conductive aid described above are mixed together to obtain a positive electrode mixture. The mixing ratio of binder to positive electrode active material can be, for example, from 20:80 to 1:99. When the positive electrode mixture contains a conductive aid, the amount added can be, for example, from 0.1 to 5% by mass relative to the mass of the entire mixture. The resulting positive electrode mixture is applied to one side of a positive electrode current collector 11 consisting of, for example, metal foil (for example, Al foil) with a thickness of 5 µm or more and 1 mm or less, and then press-molded to form a positive electrode active material layer 12. The press-molded product is then punched out to obtain a positive electrode 10 with a predetermined size (FIG. 4). After preparing the positive electrode 10, the discharge capacity A (mAh/cm$^2$) of the positive electrode 10 is measured (step ST12).

A negative electrode 20 is also prepared (step ST21). In this step, metal foil of 1 µm or more and 1 mm or less (for example, electrolytic Cu foil) can be washed with a solvent containing sulfamic acid, punched to a predetermined size, washed again ultrasonically with ethanol, and then dried to obtain a negative electrode 20.

Figure 5:
FIG. 5 is a cross-sectional view of a step in the production process for the battery in the first embodiment of the present invention.
Figure 6:
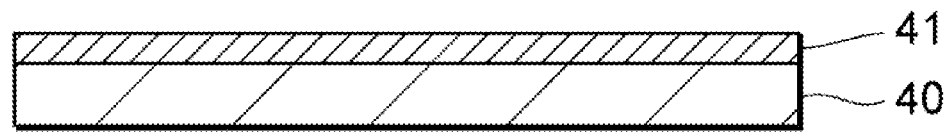
FIG. 6 is a cross-sectional view of a step in the production process for the battery in the first embodiment of the present invention.

In the present embodiment, a separator 20 is formed with a carbon layer 41 before the positive electrode 10 and the negative electrode 20 are laminated. First, as shown in FIG. 5 and FIG. 6, a carbon layer 41 is formed on the base material 40 separately from the separator (step ST31). The carbon layer 41 can be prepared, for example, in the following manner. The carbon material, binder, and, if necessary, conductive aid described above are mixed together to obtain a carbon mixture. The mixing ratio of binder to carbon can be, for example, from 20:80 to 1:99. When the carbon mixture contains a conductive aid, the amount of conductive aid can be, for example, from 0.1 to 10% by mass relative to the mass of the entire mixture. The resulting carbon mixture can be applied to one surface of a base material 40 made of metal foil (for example, Cu foil) with a thickness of 5 µm or more and 1 mm or less, and then press-molded to form a carbon layer 41. After forming the carbon layer 41, the discharge capacity B (mAh/cm$^2$) of the carbon layer 41 is measured (step ST32).

Figure 7:
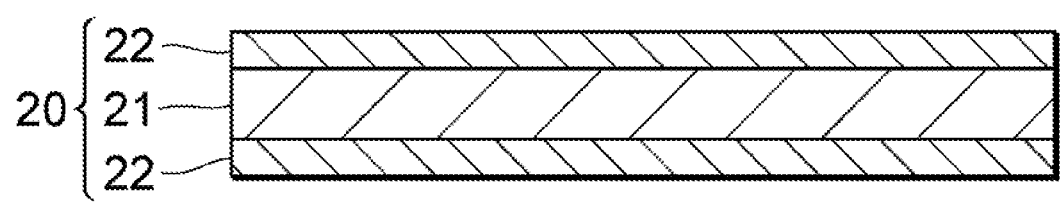
FIG. 7 is a cross-sectional view of a step in the production process for the battery in the first embodiment of the present invention.

Meanwhile, a separator 20 is prepared as shown in FIG. 7 (step ST33). In this step, the binder solution described above is applied to one side of the separator base material 21 and dried to form a separator coating layer 22 on one side, and then the binder solution is applied to the other side of the separator base material 21 and dried to form a separator coating layer 22 on the other side. These coating layers may be formed at the same time.

Figure 8:
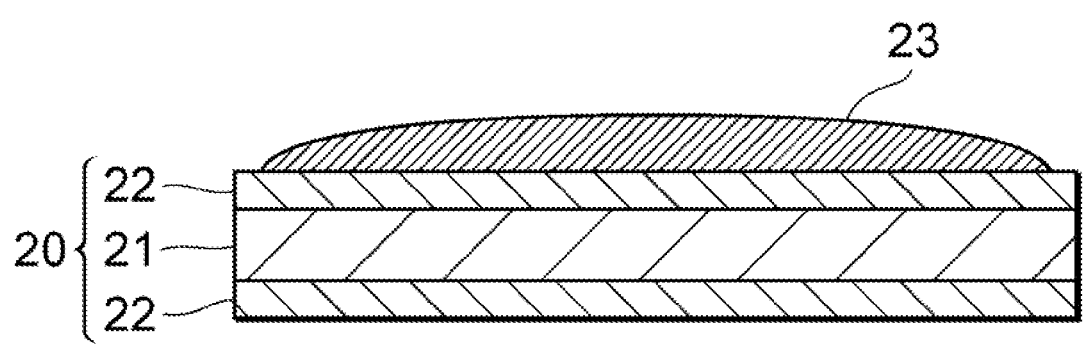
FIG. 8 is a cross-sectional view of a step in the production process for the battery in the first embodiment of the present invention.
Figure 9:
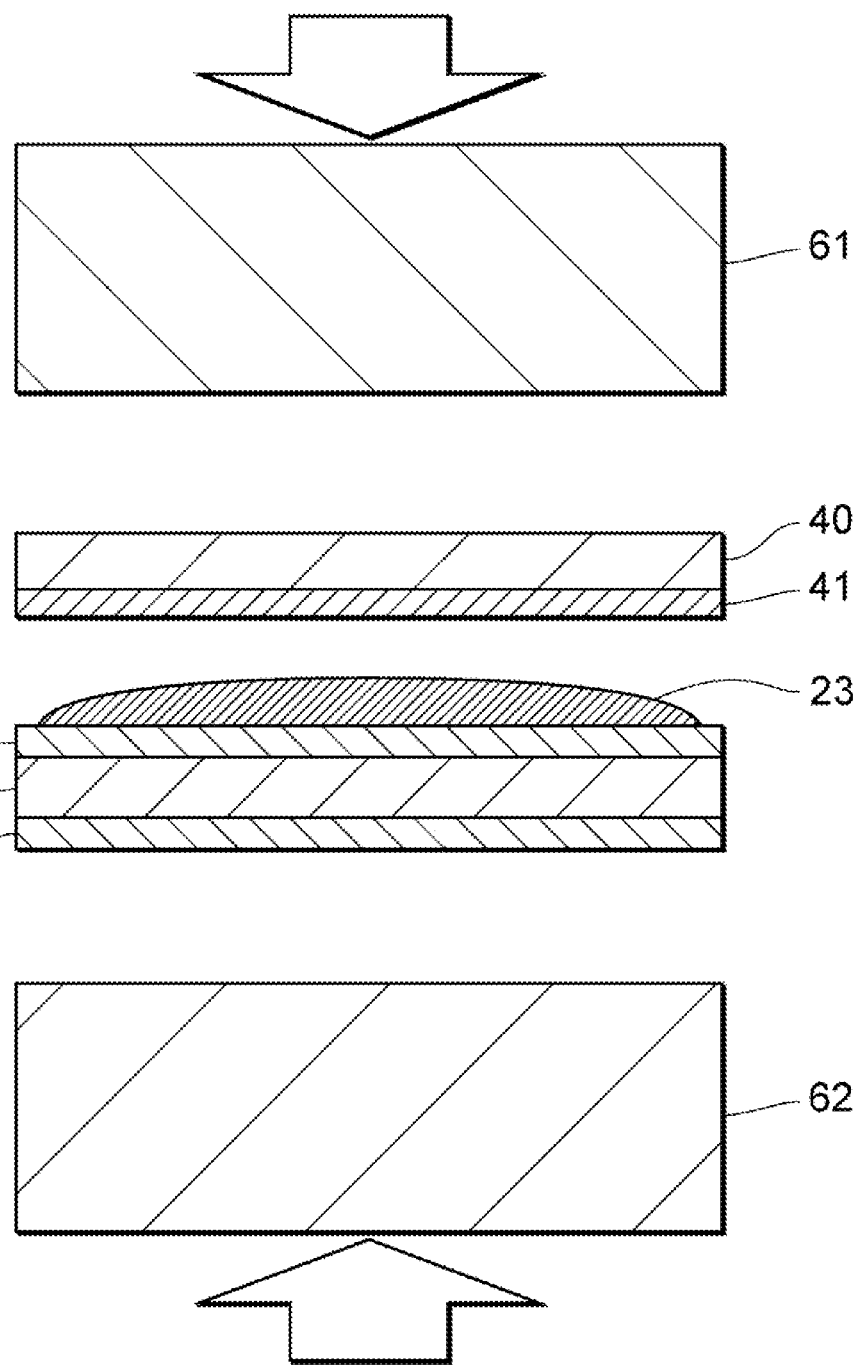
FIG. 9 is a cross-sectional view of a step in the production process for the battery in the first embodiment of the present invention.
Figure 10:
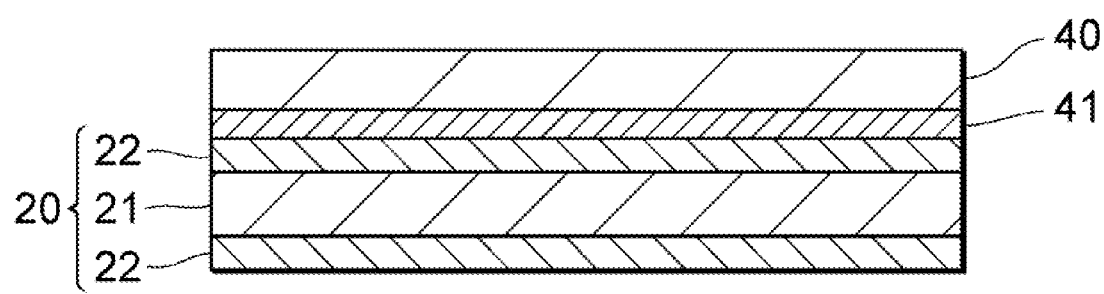
FIG. 10 is a cross-sectional view of a step in the production process for the battery in the first embodiment of the present invention.

Next, as shown in FIG. 8, an adhesive layer 23 is formed on the separator 20 (step ST34). When forming the adhesive layer 23, dimethyl carbonate (DMC), for example, can be applied to the separator 20.

Next, the carbon layer 41 on the base material 40 is transferred to the separator 20 (step ST35). In this step, first, the separator 20 and the base material 40 are overlaid so that the adhesive layer 23 on the separator 20 and the carbon layer 41 on the base material 40 face each other, and then heat plates 61, 62 are used from the outside to apply heat and pressure. The heat and pressure conditions can be, for example, from 80 to 100° C., from 3 to 7 MPa, and for about 10 to 30 seconds, depending on the type and amount of adhesive layer 23 used.

Figure 11:
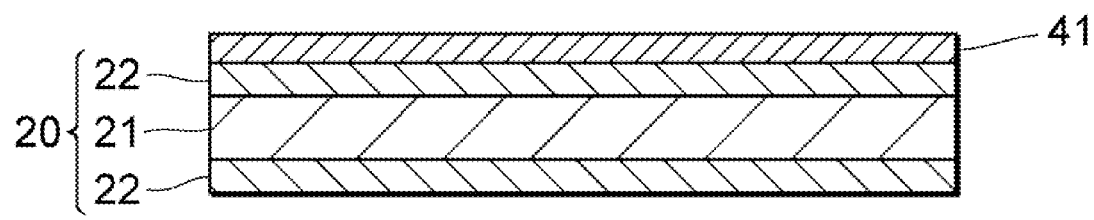
FIG. 11 is a cross-sectional view of a step in the production process for the battery in the first embodiment of the present invention.

After applying pressure (FIG. 10), and drying and cooling the adhesive layer 23, the substrate 40 is peeled off. In this way, a carbon layer 41 is firmly adhered to one side of the separator 20 as shown in FIG. 11.

Figure 12:
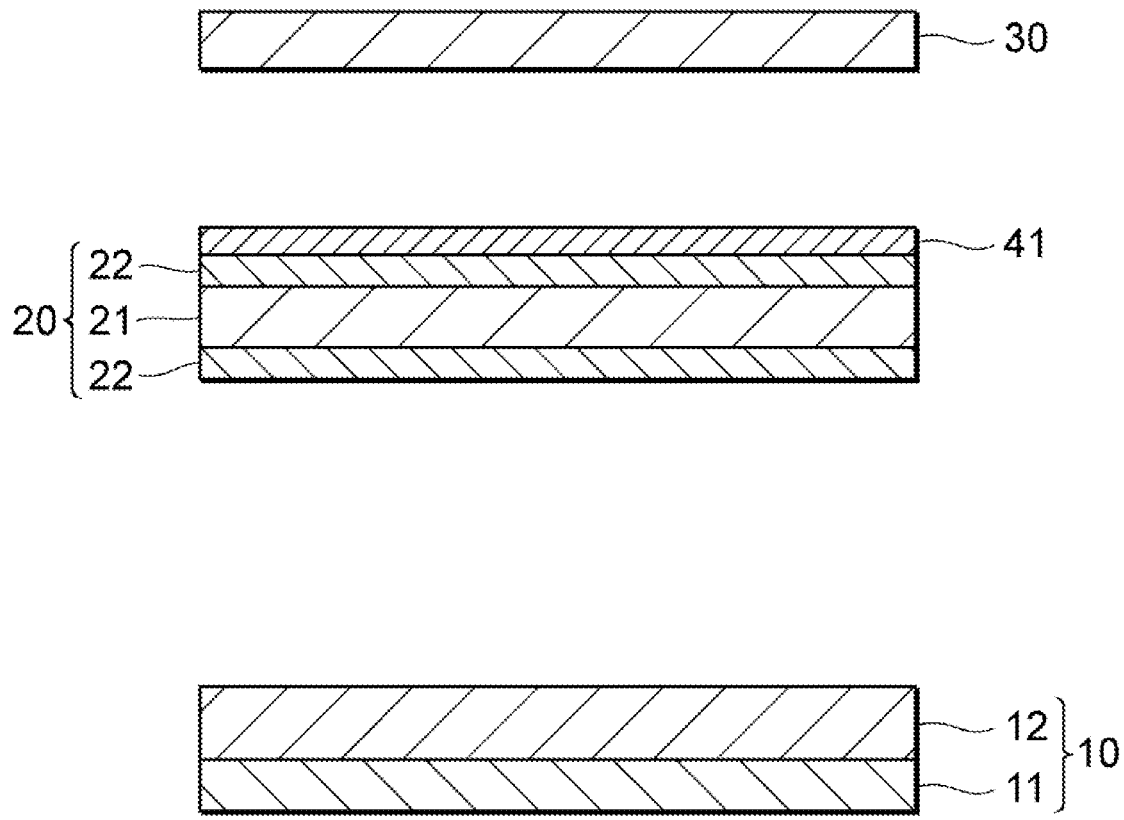
FIG. 12 is a cross-sectional view of a step in the production process for the battery in the first embodiment of the present invention.

Next, as shown in FIG. 12, the positive electrode 10, the separator 20, and the negative electrode 30 obtained in the manner described above are laminated in this order so that the carbon layer 41 faces the negative electrode 30 (step ST40).

Next, a metal terminal (for example, Al, Ni, etc.) is joined to both the positive electrode 10 and the negative electrode 30, before inserting the laminate into an outer casing. Any joining method common in the art may be used, such as ultrasonic welding. Next, the battery is completed by injecting an electrolytic solution into the outer casing (step ST50) and sealing the outer casing (FIG. 1).

In the battery production method of the present embodiment, a carbon layer 41 that has a uniform thickness and that is firmly adhered to the separator 20 can be created by forming a carbon layer 41 with a uniform thickness on the base material 40 beforehand and then transferring it to the separator 20. Also, the capacity of the carbon layer 41 produced in this way can be easily controlled. In this way, the metal layer 50 that is deposited during charging can be kept within the space between the negative electrode 30 and the separator 20, and a battery produced in which the potential can be made uniform from both sides of the deposited metal layer 50 via the negative electrode 30 and the separator 20. As a result, a battery can be produced that has excellent energy density and cycle characteristics early in the cycle.

2nd Embodiment

Figure 13:
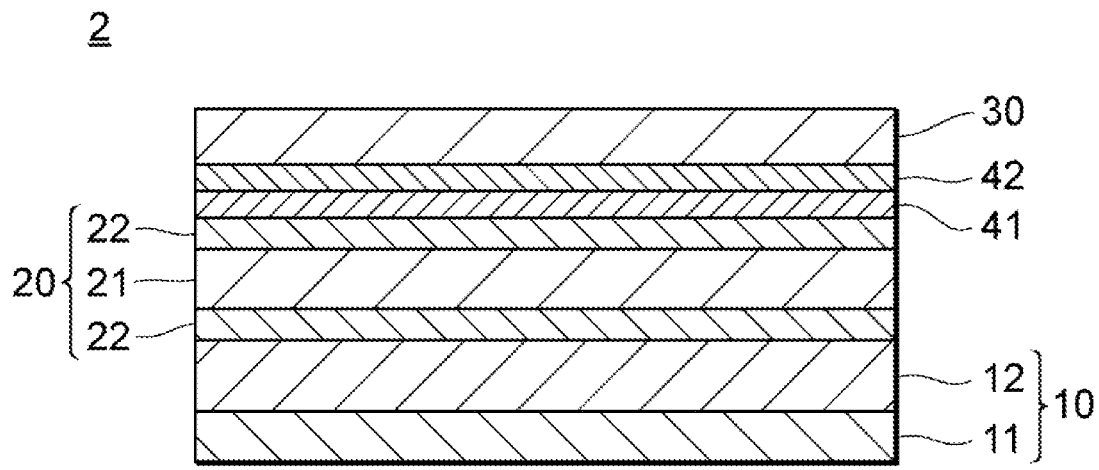
FIG. 13 is a schematic diagram of the battery in the second embodiment of the present invention.

FIG. 13 is a schematic diagram of the battery in the second embodiment of the present invention. The battery in the second embodiment differs from that in the first embodiment in that carbon layers 41, 42 are formed on the surfaces of the separator 20 and the negative electrode 30 that are arranged to face each other. Also, a separator 42 adhered to the negative electrode 30 is provided in addition to the carbon layer 41 adhered to the separator 20. In the second embodiment, the total capacity of the carbon layers 41, 42 is set to 22% or less of the capacity of the positive electrode.

Use of Battery

Figure 14:
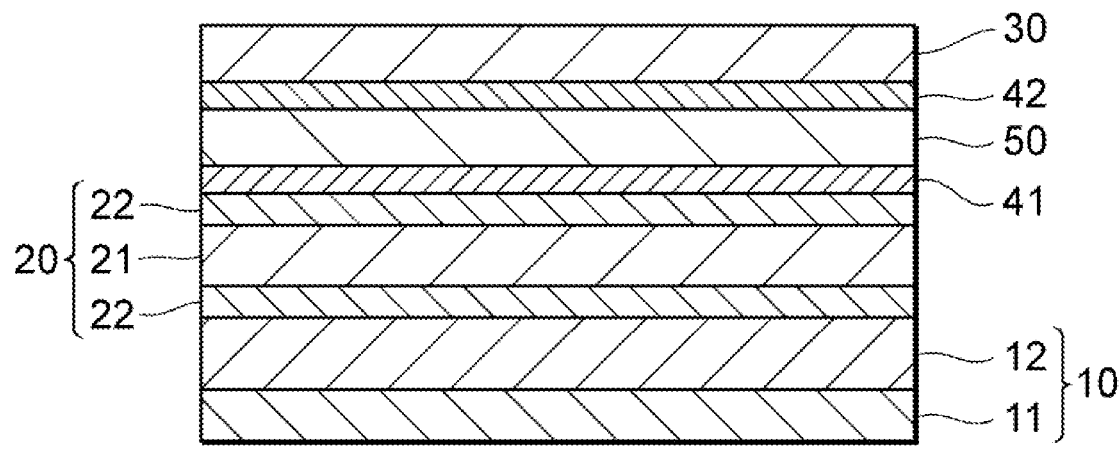
FIG. 14 is a schematic diagram of the battery in the second embodiment of the present invention at one point in the charging and discharging cycle.

FIG. 14 is a schematic diagram of the battery in the second embodiment at one point in the charging and discharging cycle. In the battery in the present embodiment, lithium metal is deposited on the negative electrode 30 during charging to form a deposited metal layer 50, and the deposited metal layer 50 on the negative electrode 30 dissolves during discharging. However, this deposited metal layer is formed between carbon layer 41 and carbon layer 42.

In the present embodiment, because uniform potential can be applied from both sides of the deposited metal layer 50 on the surface of the negative electrode 30 via the two carbon layers 41, 42 formed on the separator 20 and the negative electrode 30, the deposited metal film 50 can be deposited uniformly and efficiently dissolved. Therefore, the second embodiment, like the first embodiment, can suppress growth of the deposited metal layer 50 in dendrite form and keep an undissolved inactive deposited metal layer 50 from remaining behind, thus improving the cycle characteristics. Also, a drop in the initial energy density can be suppressed by setting the total capacity of the carbon layers 41, 42 to a level that is 22% or less of the capacity of the positive electrode.

Battery Production Method

Figure 15:
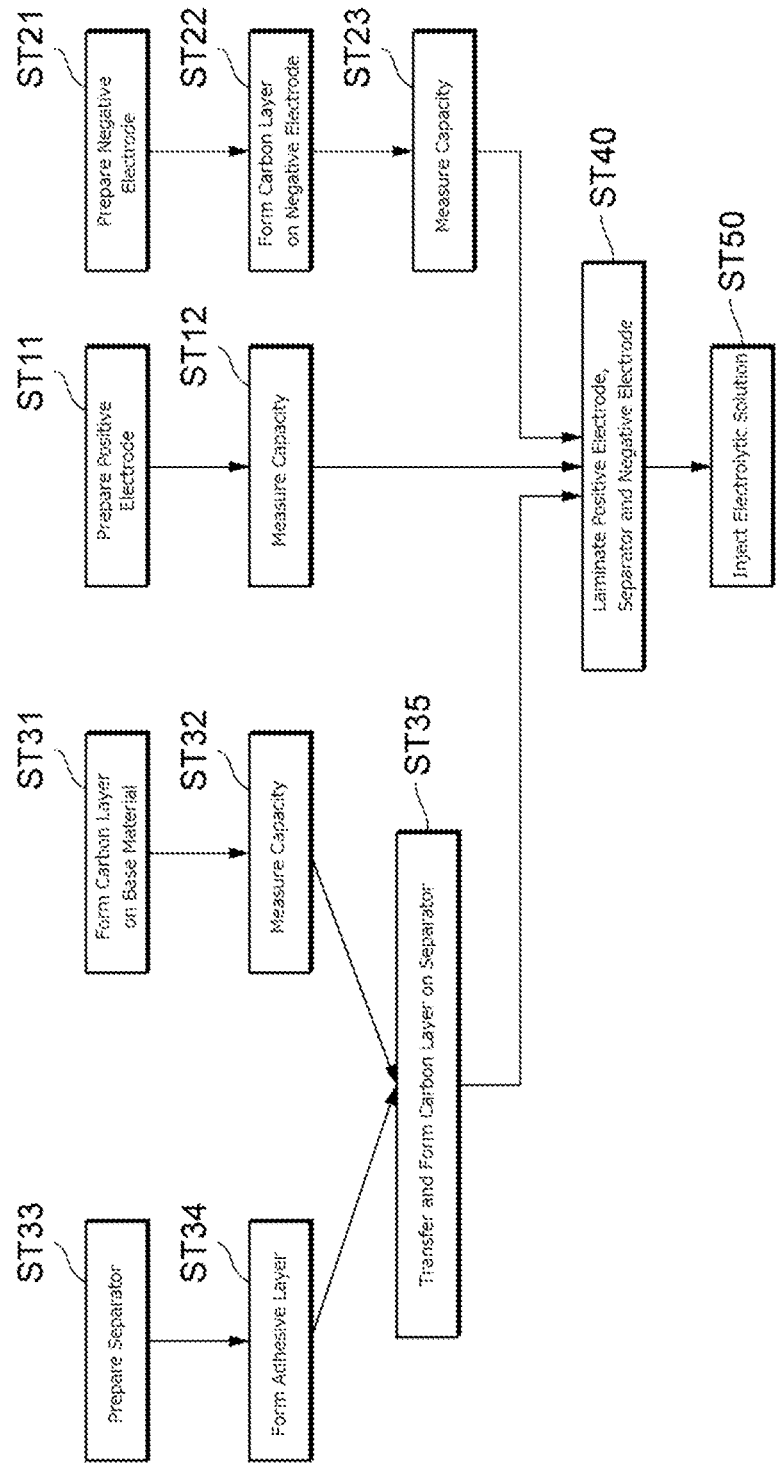
FIG. 15 is a flow chart showing the production steps of the battery in the second embodiment of the present invention.

The method used to produce the battery in the second embodiment will now be explained with reference to the flowchart in FIG. 15. In the second embodiment, a step of forming a carbon layer 42 on the negative electrode 30 (step ST22) and a step of measuring the capacity of the carbon layer 42 formed on the negative electrode 30 are added to the first embodiment.

The carbon layer 42 can be prepared on the negative electrode 30, for example, in the following manner. The carbon material, binder, and, if necessary, conductive aid described above are mixed together to obtain a carbon mixture. The mixing ratio of binder to carbon can be, for example, from 20:80 to 1:99. When the carbon mixture contains a conductive aid, the amount of conductive aid can be, for example, from 0.1 to 10% by mass relative to the mass of the entire mixture. The resulting carbon mixture can be applied to one surface of a negative electrode 30 made of metal foil (for example, Cu foil) with a thickness of 5 μm or more and 1 mm or less, and then press-molded to form a carbon layer 42. After forming the carbon layer 42, the discharge capacity (mAh/cm$^2$) of the carbon layer 42 is measured (step ST23). In the second embodiment, the total capacity B (mAh/cm2) of the carbon layers 41, 42 is controlled to be 22% or less of the capacity A of the positive electrode.

Figure 16:
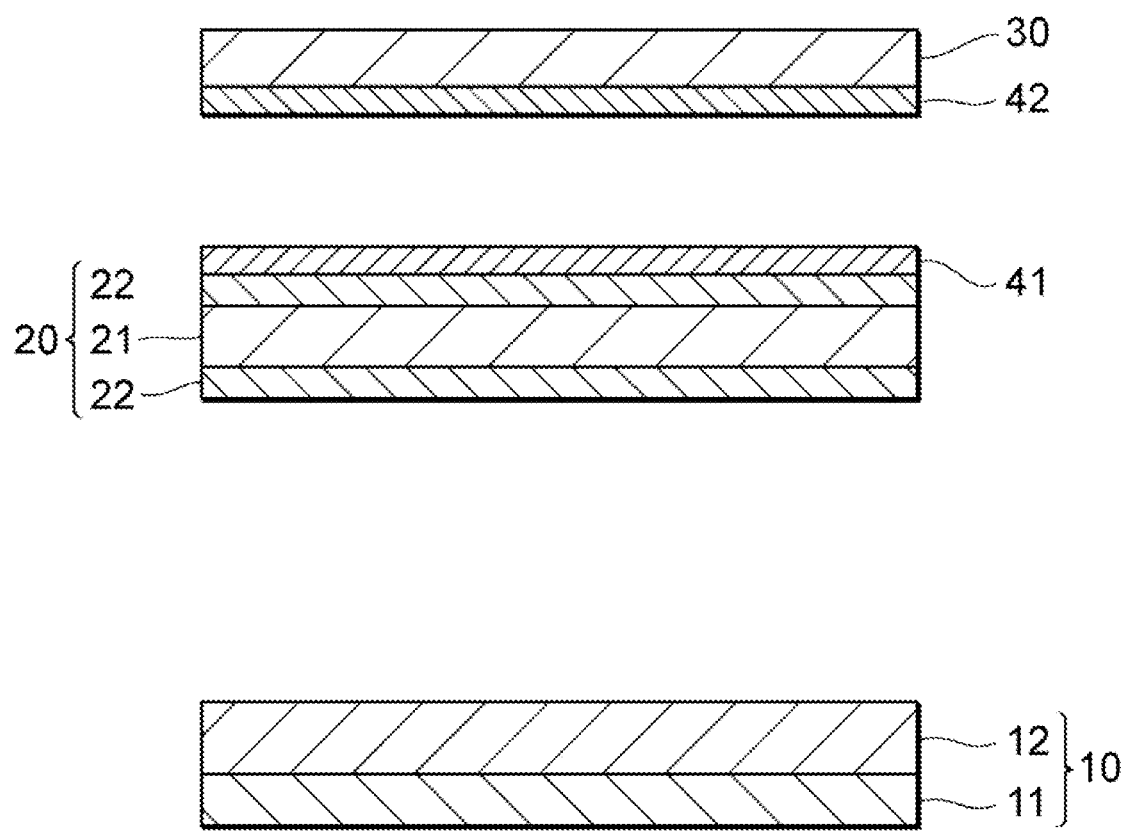
FIG. 16 is a cross-sectional view of a step in the production process for the battery in the second embodiment of the present invention.

Next, the positive electrode 10, the separator 20, and the negative electrode 30 are laminated in this order so that the carbon layer 41 faces the negative electrode 30 as shown in FIG. 16 (step ST40), an electrolytic solution is injected (step ST50), and the outer casing is sealed in the same manner as in the first embodiment to produce a battery (FIG. 13).

In the battery production method of the second embodiment, carbon layers 41, 42 firmly adhered to the separators 20, 30 can be formed, and the total capacity of the resulting carbon layers 41, 42 can be easily controlled. In this way, the metal layer 50 deposited during charging can be kept within the space between the two carbon layers 41, 42, and a battery can be produced in which the potential can be made uniform from both sides of the deposited metal layer 50 via the carbon layers 41, 42. As a result, as in the first embodiment, a battery can be produced in the second embodiment that has excellent energy density and cycle characteristics early in the cycle.

3rd Embodiment

Figure 17:
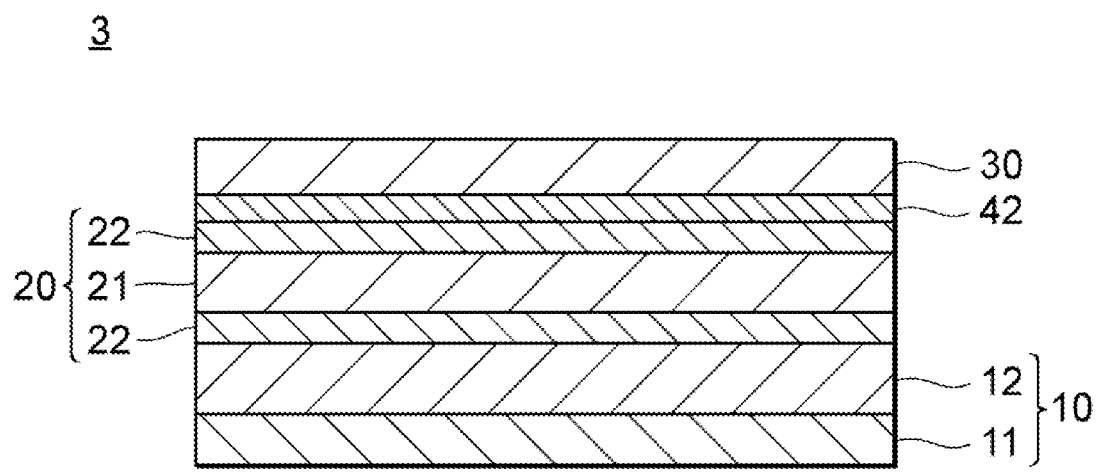
FIG. 17 is a schematic diagram of the battery in the third embodiment of the present invention.

FIG. 17 is a schematic diagram of the battery in the third embodiment of the present invention. The battery in the third embodiment differs from that of the first embodiment in that the carbon layer 42 arranged between the separator 20 and the negative electrode 30 adheres more firmly to the negative electrode 30 than to the separator 20. In the third embodiment, the capacity of the carbon layer 42 is set to 22% or less of the capacity of the positive electrode.

Use of Battery

Figure 18:
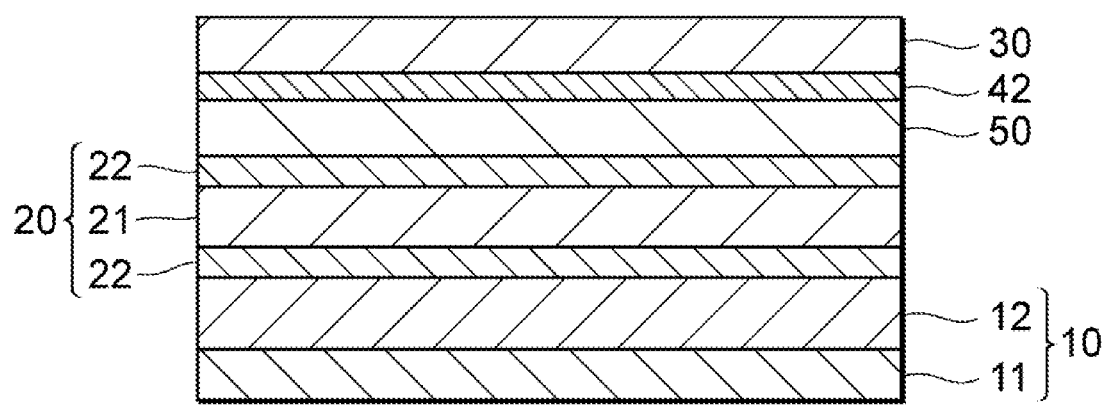
FIG. 18 is a schematic diagram of the battery in the third embodiment of the present invention at one point in the charging and discharging cycle.

FIG. 18 is a schematic diagram of the battery in the third embodiment at one point in the charging and discharging cycle. In the battery in the present embodiment, lithium metal is deposited on the negative electrode 30 during charging to form a deposited metal layer 50, and the deposited metal layer 50 on the negative electrode 30 dissolves during discharging. However, this deposited metal layer is formed between carbon layer 42 and the separator 20.

In the present embodiment, potential is applied from one side of the deposited metal layer 50 via the carbon layer 42 formed on the negative electrode 30 to make uniform deposition and efficient dissolution of the deposited metal layer 50 possible. While the third embodiment is inferior to the first and second embodiments whose potential can be made uniform from both surfaces of the deposited metal layer 50, compared to a structure lacking a carbon layer, growth of the deposited metal layer 50 in dendrite form can be prevented, and the presence of an undissolved, residual, inactive deposited metal layer 50 can be suppressed. As a result, the battery has excellent initial energy density and cycle characteristics. While the details are unclear, the base material in the third embodiment on which lithium metal is deposited is not copper foil but a carbon layer, and the difference in surface properties is believed to have some effect.

Battery Production Method

Figure 19:
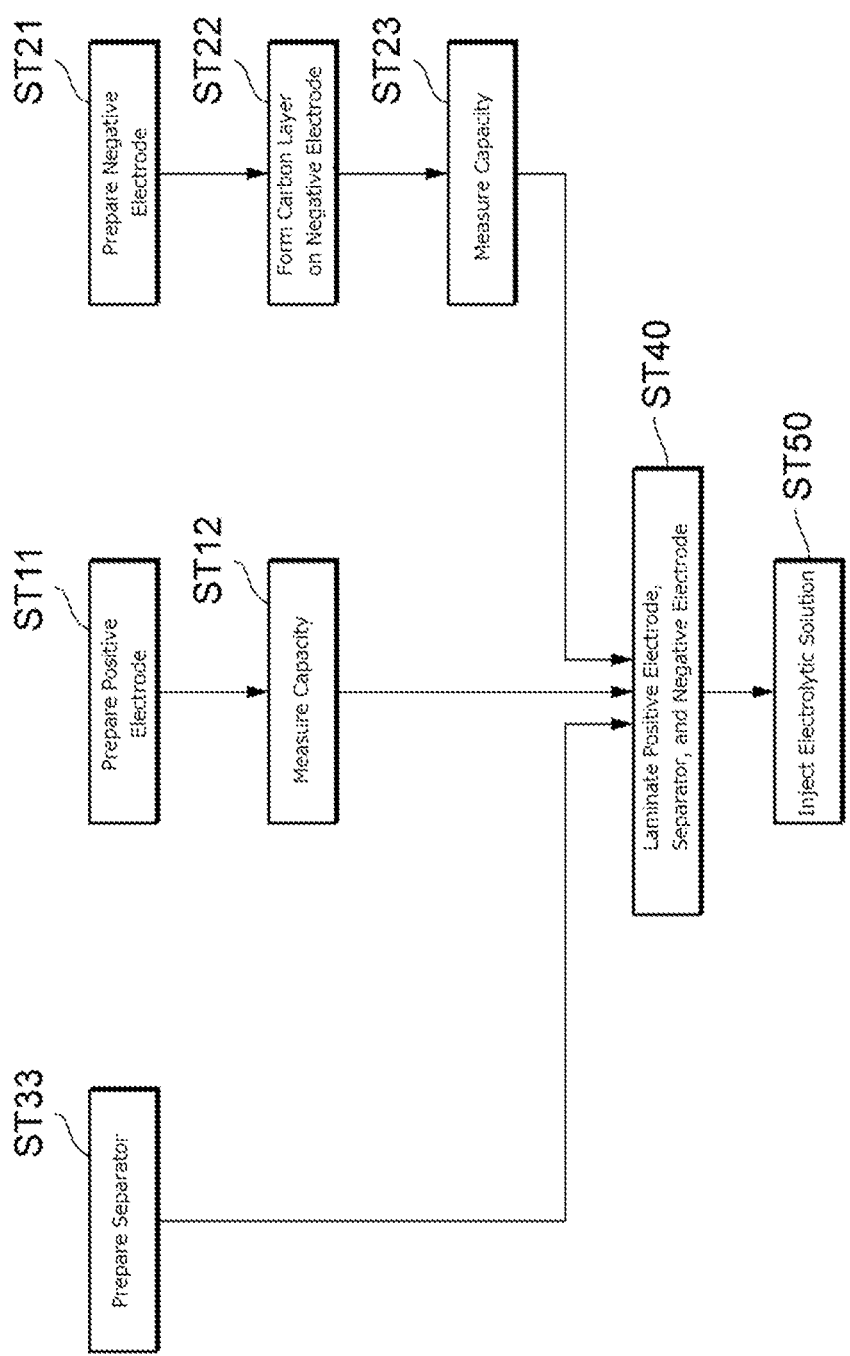
FIG. 19 is a flow chart showing the production steps of the battery in the third embodiment of the present invention.
Figure 20:
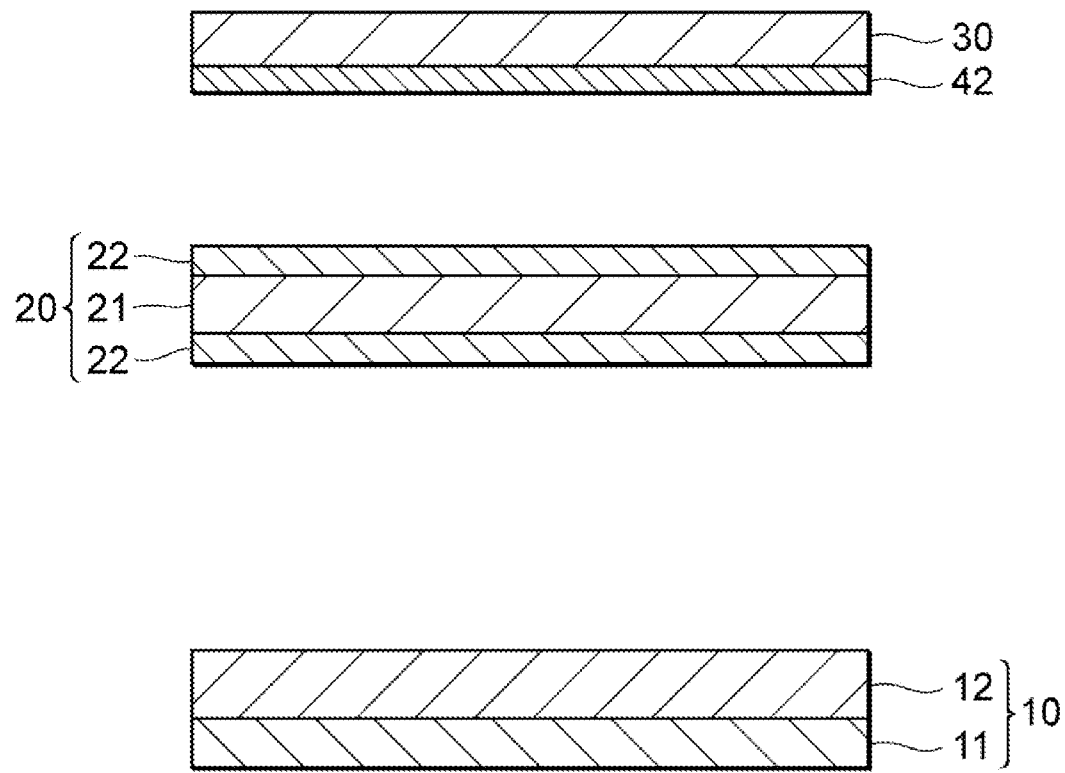
FIG. 20 is a cross-sectional view of a step in the production process for the battery in the third embodiment of the present invention.

The method used to produce the battery in the third embodiment will now be explained with reference to the flowchart in FIG. 19. In the third embodiment, unlike the first embodiment, there are no steps (steps 31, 32, 34) for forming a carbon layer 41 on the separator 20. Instead, as in the second embodiment, a step of forming a carbon layer 42 on the negative electrode 30 (step ST22) and a step of measuring the capacity of the carbon layer 42 formed on the negative electrode 30 are added.

In the battery production method of the third embodiment, a carbon layer 42 adhered to the negative electrode 30 can be formed, and the total capacity of the resulting carbon layer 42 can be easily controlled. In this way, a battery can be produced in which the potential of the deposited metal layer 50 can be made uniform via the carbon layer 42. While the third embodiment is inferior to the first and second embodiments whose potential can be made uniform from both surfaces of the deposited metal layer 50, a battery can be produced that has excellent energy density and cycle characteristics early in the cycle.

The embodiments described above are provided merely to explain the present invention and are not intended to limit the present invention to the embodiments. Various modifications are possible without departing from the scope and spirit of the present invention.

EXAMPLES

The following is a more detailed description of the present invention with reference to examples and comparative examples. The present invention is not limited in any way by these examples.

Example 1

Positive Electrode

A NCM622 (LiNi$_{0.6}$Co$_{0.2}$Mn$_{0.2}$O$_2$) positive electrode active material, a PVdF binder, a conductive aid, and an N-methyl-pyrrolidone (NMP) solvent were mixed together to prepare a slurry, which was applied to aluminum foil serving as the positive electrode current collector 11, dried, and pressed. A test cell was prepared using lithium metal as the counter electrode. The test cell was charged at 4.2 VCC and discharged at 3.0 VCC at a current equivalent to 0.1 C to determine the discharge capacity A (mAh/cm$^2$).

Separator

Carbon black, a PVdF binder, and an NMP solvent were mixed to prepare a slurry, and the slurry was coated on copper foil serving as the base material 40, dried, and pressed. A test cell using the electrode described above and lithium metal as the counter electrode was prepared. Its discharge capacity as a lithium battery negative electrode was determined in advance. In other words, CCCV charging was performed at 0 VC (lithium doping to carbon) and discharging 3.0 VCC (same undoping) were performed at a current equivalent of 0.1 C to determine the discharge capacity (the capacity at the time of lithium undoping) B (mAh/cm$^2$). Meanwhile, a separator 20 whose surface was coated with a mixture of PVdF and Al$_2$O$_3$ was obtained, DMC (dimethyl carbonate) was added dropwise to the separator, carbon-coated copper foil was applied so that the coated surface faced the separator 20, and the laminate was heat-pressed at 90° C. for 20 seconds. After cooling the heat-pressed laminate, the copper foil portion was peeled off to obtain a separator 20 in which the carbon layer 41 was fused to the PVdF/Al$_2$O$_3$ mixture layer.

Negative Electrode and Electrolytic Solution

Copper foil was used as the negative electrode. The electrolytic solution was obtained by dissolving 4M LiFSI in DME (dimethoxyethane).

A cell was prepared using one each of the positive electrode, the separator, the negative electrode, and an aluminum laminate as the outer casing, and the cell was sealed and used in the cycle evaluation. The separator was laminated with the conductive thin film facing the negative electrode side to complete the cell. In this way, a battery was prepared in Example 1 with a structure corresponding to the first embodiment.

Examples 2 to 5

In Examples 2 to 5, a battery was prepared in the same manner as Example 1 except that the composition of the carbon layer and the capacity were different.

Examples 6 to 7

In Examples 6 and 7, a battery was prepared in the same manner as Example 1 except that a carbon layer was formed not only on the separator 20 but also on the negative electrode 30. In other words, Examples 6 and 7 are working examples whose structures correspond to that of the second embodiment.

Example 8

In Example 8, a battery was prepared in the same manner as Example 1 except that a carbon layer was formed only on the negative electrode 30 and not on the separator 20. In other words, Examples 6 and 7 are working examples whose structures correspond to that of the third embodiment.

Comparative Example 1

In Comparative Example 1, a battery was produced in the same manner as in Example 1 except that a carbon layer was not formed.

Comparative Examples 2 to 3

In Comparative Examples 2 and 3, a battery was prepared in the same manner as Example 1 except that the composition or capacity of the carbon coating layer differed from that of Example 1.

Comparative Example 4

In Comparative Example 4, a battery was prepared in the same manner as Examples 6 and 7 except that the composition or capacity of the carbon coating layer differed from that of Examples 6 and 7.

Evaluation of Energy Density and Cycle Characteristics

The energy density and cycle characteristics of the batteries produced in each of the examples and comparative examples were evaluated as follows.

Specifically, a flat cell was clipped between metal plates on both sides and charging and discharging cycles were performed. The cell was charged at 4.2 VCC with a current equivalent to 0.1 C and discharged at 3.0 VCC with a current equivalent to 0.1 C, and this charging and discharging cycle test was performed at a temperature of 25° C. For comparative purposes, the initial capacity of the battery in Example 1 was set at 100. Table 1 shows the capacity retention rate of the batteries after 30 cycles.

TABLE 1

|  | Form | Negative Electrode | Carbon Layer Composition | Capacity Ratio B/A/% | Percent of Initial Discharge Capacity (Ex. 1 = 100) | Capacity Retention Ratio After 30 Cycles/% |
| --- | --- | --- | --- | --- | --- | --- |
| Ex. 1 | 1 | Cu | CB:PVdF = 95:5 | 16 | 100 | 87 |
| Ex. 2 | 1 | Cu | GR:PVdF = 95:5 | 8 | 103 | 90 |
| Ex. 3 | 1 | Cu | Si:CB:PVdF = 17:78:5 | 14 | 95 | 85 |
| Ex. 4 | 1 | Cu | CB:PVdF = 95:5 | 22 | 95 | 84 |
| Ex. 5 | 1 | Cu | CB:PVdF = 95:5 | 5 | 105 | 91 |

TABLE 1-continued

| | Form | Negative Electrode | Carbon Layer Composition | Capacity Ratio B/A/% | Percent of Initial Discharge Capacity (Ex. 1 = 100) | Capacity Retention Ratio After 30 Cycles/% |
|---|---|---|---|---|---|---|
| Ex. 6 | 2 | Cu | GR:PVdF = 95:5 | 19 | 91 | 80 |
| Ex. 7 | 2 | Cu | Si:CB:PVdF = 17:78:5 | 13 | 90 | 85 |
| Ex. 8 | 3 | Cu | GR:PVdF = 95:5 | 14 | 90 | 80 |
| C. Ex. 1 | — | Cu | — | — | 110 | 45 |
| C. Ex. 2 | 1 | Cu | CB:PVdF = 95:5 | 30 | 88 | 70 |
| C. Ex. 3 | 1 | Cu | Si:CB:PVdF = 17:78:5 | 42 | 78 | 68 |
| C. Ex. 4 | 2 | Cu | CB:PVdF = 95:5 | 33 | 86 | 72 |

In Table 1, the number in the "Form" column indicates the number of the embodiment corresponding to the example. Also, in Table 1, "CB" denotes carbon black (Super C45 from Imerys), "GR" denotes graphite (LT-AC-1 from Eitan Japan), and "Si" denotes a silicon powder reagent with an average particle size of 100 nm.

As seen in Table 1, Examples 1 to 8 have an excellent initial discharge capacity ratio and 30-cycle capacity retention rate compared to Comparative Examples 1 to 4. Specifically, both an initial discharge capacity ratio of 90 or more and a 30-cycle capacity retention rate of 75% or more can be realized.

INDUSTRIAL APPLICABILITY

Because a battery of the present invention has high energy density and excellent cycle characteristics, it has industrial applicability as a power storage device used in various applications.

REFERENCE SIGNS LIST 1, 2, 3: Battery
10: Positive electrode
11: Positive electrode current collector
12: Positive electrode active material layer
20: Separator
21: Separator base material
22: Separator coating layer
30: Negative electrode
41, 42: Carbon layer
50: Deposited metal layer

What is claimed is:

1. A battery comprising: a positive electrode;
a negative electrode that is free of a negative electrode active material and consists of a negative electrode current collector, wherein:
   the negative electrode current collector consists of a material selected from the group consisting of: Cu; Ni; Ti; Fe; an alloy of Cu, Ni, Ti, or Fe; and stainless steel;
a separator that is disposed between the positive electrode and the negative electrode; and
an anti-dendrite layer comprising carbon that is disposed between the separator and the negative electrode, wherein;
   the anti-dendrite layer adheres more strongly to the separator than to the negative electrode;
   a thickness of the anti-dendrite layer is between 0.1 μm and 50 μm; and
   the capacity of the anti-dendrite layer is 22% or less of the capacity of the positive electrode.

2. The battery according to claim 1, further comprising an electrolytic solution in which the separator and the anti-dendrite layer are immersed.

3. The battery according to claim 1, wherein the anti-dendrite layer contains a metal that can form an alloy with lithium.

4. The battery according to claim 1, wherein the capacity of the anti-dendrite layer is 5% or more of the capacity of the positive electrode.

5. The battery according to claim 1, wherein the separator includes a separator base material and a separator coating layer coating one or both sides of the separator base material.

6. The battery according to claim 1, wherein the battery is a lithium secondary battery that performs charging and discharging by depositing lithium metal on the surface of the negative electrode and dissolving the deposited lithium metal.

7. A method for producing a battery, the method comprising the steps of:
   forming a carbon layer on at least one surface of a separator and a negative electrode arranged so as to face each other, wherein:
      the negative electrode is free of a negative electrode active material and consists of a negative electrode current collector, and wherein the negative electrode current collector consists of a material selected from the group consisting of: Cu; Ni; Ti; Fe; an alloy of CU, Ni, Ti, or Fe; and stainless steel; and
   forming a laminate by laminating the negative electrode, the separator, and a positive electrode,
   wherein an anti-dendrite layer comprising carbon having a capacity of 22% or less of the capacity of the positive electrode is formed in the step of forming the carbon layer,
      the anti-dendrite layer adheres more strongly to the separator than to the negative electrode; and
      a thickness of the anti-dendrite layer is between 0.1 μm and 50 μm.

8. The method for producing a battery according to claim 7, wherein the carbon layer is formed on the separator in the step of forming the carbon layer.

9. The method for producing a battery according to claim 8, wherein the step of forming the carbon layer on the separator includes a step of forming the carbon layer on a base material, and a step of transferring the carbon layer on the base material to the separator.

10. The method for producing a battery according to claim 9, wherein the step of transferring the carbon layer on the base material to the separator includes a step of adhering the carbon layer on the base material and the separator via an adhesive layer and a step of peeling off the base material.

11. The method for producing a battery according to claim 7, wherein the carbon layer is formed on the negative electrode in the step of forming the carbon layer.

12. The method for producing a battery according to claim 7, wherein the carbon layer is formed on both surfaces of the separator and the negative electrode arranged so as to face each other in the step of forming the carbon layer.

13. The method for producing a battery according to claim 7, wherein the anti-dendrite layer containing a metal that is able to form an alloy with lithium is formed in the step of forming the carbon layer.

14. The method for producing a battery according to claim 7, further comprising a step of injecting an electrolytic solution into the laminate in the step of forming the laminate.

15. The method for producing a battery according to claim 7, wherein the anti-dendrite layer having a capacity that is 5% or more of the capacity of the positive electrode is formed in the step of forming the carbon layer.

* * * * *